United States Patent
Santero et al.

(10) Patent No.: US 9,716,745 B2
(45) Date of Patent: Jul. 25, 2017

(54) EXPERTISE-MATCHED HELP SYSTEMS

(71) Applicant: International Business Machines Corporation, Armonk, NY (US)

(72) Inventors: Melissa J. G. Santero, Tucson, AZ (US); Nedzad Taljanovic, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 612 days.

(21) Appl. No.: 14/158,804

(22) Filed: Jan. 18, 2014

(65) Prior Publication Data
US 2015/0206063 A1    Jul. 23, 2015

(51) Int. Cl.
| G06F 9/44 | (2006.01) |
| G06Q 30/00 | (2012.01) |
| G06N 5/00 | (2006.01) |
| H04L 29/08 | (2006.01) |

(52) U.S. Cl.
CPC ............ *H04L 67/10* (2013.01); *G06F 9/4446* (2013.01); *G06N 5/00* (2013.01); *G06Q 30/016* (2013.01); *H04L 67/22* (2013.01)

(58) Field of Classification Search
None
See application file for complete search history.

(56) References Cited

U.S. PATENT DOCUMENTS

| 4,992,972 | A |   | 2/1991 | Brooks et al. |
| 5,774,118 | A | * | 6/1998 | Hatakama ............ G06F 9/4446 715/707 |
| 6,021,403 | A | * | 2/2000 | Horvitz ................ G06F 9/4446 706/11 |
| 7,526,722 | B2 | * | 4/2009 | Wadhwa .............. G06F 9/4446 715/705 |

(Continued)

FOREIGN PATENT DOCUMENTS

JP   2007317194 A   6/2005

OTHER PUBLICATIONS

Hurst et al, Dynamic Detection of Novice vs Skilled Use Without a Task Model, 2007.*

(Continued)

*Primary Examiner* — Stanley K Hill
*Assistant Examiner* — Mikayla Chubb
(74) *Attorney, Agent, or Firm* — Nelson and Nelson; Daniel P. Nelson; Alexis V. Nelson

(57) ABSTRACT

A method for tailoring help systems to the expertise of users includes recording data related to a user's interaction with a product. The data is then analyzed to ascertain a level of expertise of the user relative to using the product. Upon receiving a request for assistance from the user with respect to the product, a help system may be selected based on the determined level of expertise of the user. The method may automatically provide assistance to the user through a more advanced help system in the event the user is ascertained to have a more advanced level of expertise. Similarly, the (Continued)

method may automatically provide assistance to the user through a less advanced help system in the event the user is ascertained to have a less advanced level of expertise. A corresponding apparatus and computer program product are also disclosed.

17 Claims, 6 Drawing Sheets

(56) References Cited

U.S. PATENT DOCUMENTS

| | | | | |
|---|---|---|---|---|
| 8,151,192 B2* | 4/2012 | Black | .................... | G06F 9/4446 715/705 |
| 2007/0157093 A1* | 7/2007 | Karcher | ................ | G06F 9/4446 715/707 |
| 2007/0220429 A1* | 9/2007 | Kureshy | ............... | G06F 9/4446 715/708 |
| 2007/0277104 A1 | 11/2007 | Hennum et al. | | |
| 2008/0172574 A1* | 7/2008 | Fisher | .................... | G06Q 10/06 714/25 |
| 2008/0229362 A1* | 9/2008 | White | ................ | H04N 5/44543 725/47 |
| 2009/0089751 A1* | 4/2009 | Raikes | .................. | G06F 9/4446 717/120 |
| 2013/0159199 A1* | 6/2013 | Keil | ........................ | G06Q 10/06 705/304 |

OTHER PUBLICATIONS

Sukaviriya et al, Supporting Adaptive Interfaces in a Knowledge-Based User Interface Environment, 1993.*
Vaubel et al, Inferring User Expertise for Adaptive Interfaces, 1990.*
Zhao et al, Personalized Adaptive Content System for Context-Aware Mobile Learning, 2008.*

* cited by examiner $$\text{Expertise Level} = C_1A_1 + C_2A_2 + C_3A_3 + \ldots + C_NA_N$$

EXPERTISE-MATCHED HELP SYSTEMS

BACKGROUND

Field of the Invention

This invention relates to apparatus and methods for matching help systems to the expertise level of users.

Background of the Invention

Many products (e.g., hardware and software systems) provide technical support or help systems to assist users who encounter problems or have general questions about a product's capabilities or features. Such technical support and help systems may come in a variety of forms, including printed manuals and reference literature, phone numbers for users to call to reach support personnel, and online support materials such as web pages, community forums, lists of commonly asked questions, email support, video tutorials, chat assistants, and the like. In some cases, such as when users are using applications or surfing web sites, tailored technical assistance, also referred as context-sensitive help, may be provided based on where a user currently is in the application or web site.

Nevertheless, current technical support and help systems are not without their shortcomings. For example, users of products may have various levels of expertise, from novice to advanced. Nevertheless, users are often directed to the same technical support personnel and/or help systems when troubleshooting a product or asking for product information regardless of their level of expertise. For example, when an advanced user encounters a problem or has a question, the advanced user may be directed to a phone number that is the same for all users of the product. In some cases, the advanced user may be placed in contact with support personnel, in some cases reading prewritten scripts or other materials, that may have no more expertise than the user that is requesting assistance. This can be very frustrating for advanced users and may result in bad customer service as well as dissatisfaction with a product. Likewise, novice users may be placed in contact with support personnel or help materials that may be more advanced than what the users are currently capable of understanding. This can likewise lead to frustration and dissatisfaction with a product.

In view of the foregoing, what are needed are apparatus and methods to more carefully tailor technical assistance and help systems to the expertise of users. Ideally, such apparatus and methods will be seamless and require little if any effort on the part of users.

SUMMARY

The invention has been developed in response to the present state of the art and, in particular, in response to the problems and needs in the art that have not yet been fully solved by currently available apparatus and methods. Accordingly, apparatus and methods have been developed to tailor help systems to the expertise of users. The features and advantages of the invention will become more fully apparent from the following description and appended claims, or may be learned by practice of the invention as set forth hereinafter.

Consistent with the foregoing, a method for tailoring help systems to the expertise of users is disclosed herein. In one embodiment, such a method includes recording data related to a user's interaction with a product. The data is then analyzed to ascertain a level of expertise of the user relative to using the product. Upon receiving a request for assistance from the user with respect to the product, a help system may be selected based on the determined level of expertise of the user. For example, the method may automatically provide assistance to the user through a more advanced help system in the event the user is ascertained to have a more advanced level of expertise. Similarly, the method may automatically provide assistance to the user through a less advanced help system in the event the user is ascertained to have a less advanced level of expertise.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
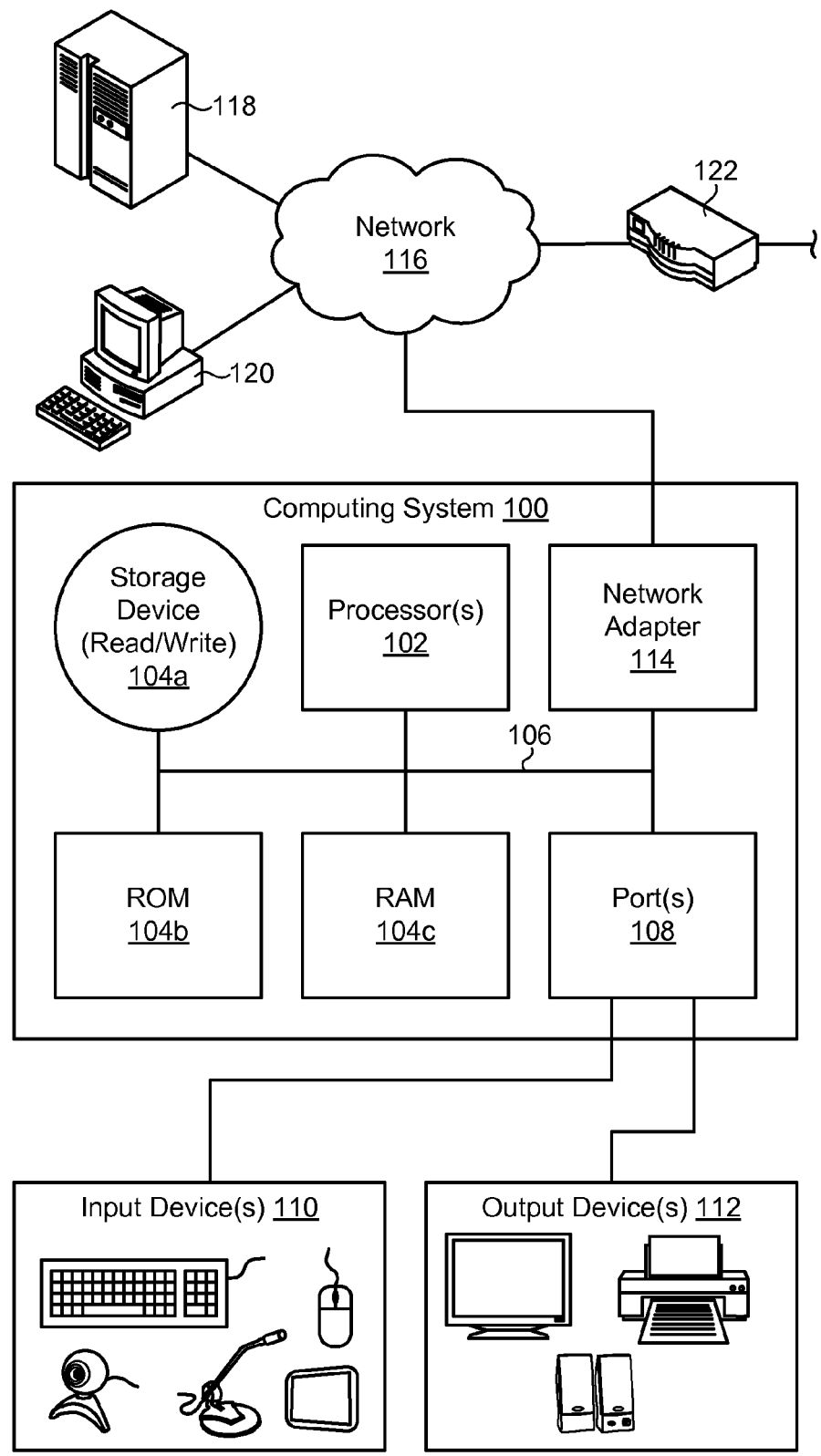
FIG. 1 is a high-level block diagram showing one example of a computing system in which various components or modules of an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, conventional procedural programming languages such as the "C" programming language, scripting languages such as JavaScript, or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computing system 100 is illustrated. The computing system 100 is presented to show one example of an environment where various components or modules of an apparatus and method in accordance with the invention may be implemented. The computing system 100 is presented only by way of example and is not intended to be limiting. Indeed, the apparatus and methods disclosed herein may be applicable to a wide variety of different computing systems in addition to the computing system 100 shown. The apparatus and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

Figure 2:
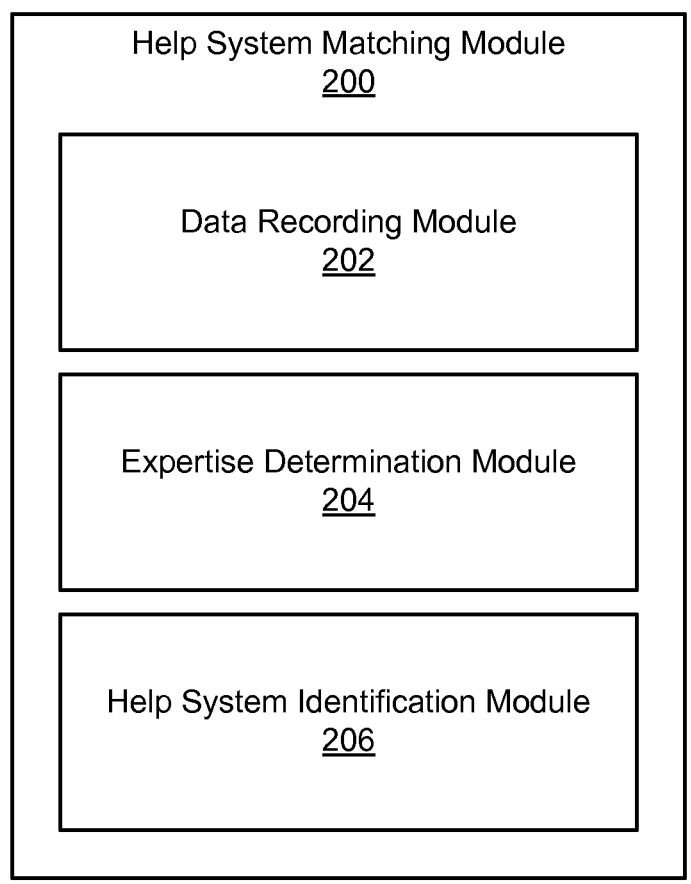
FIG. 2 is a block diagram showing a high-level view of one embodiment of a help system matching module used to implement an expert-matched help system, including various sub-modules that may be included therein.

Referring to FIG. 2, one embodiment of a help system matching module 200 for tailoring help systems to the expertise of users is illustrated. As shown, the help system matching module 200 includes one or more sub-modules providing various features and functions. These modules may be implemented in hardware, software or firmware executable on hardware, or a combination thereof. The modules are presented only by way of example and are not intended to be limiting. Indeed, alternative embodiments may include additional or fewer modules than those illustrated, or the modules may be organized differently. Furthermore, in some embodiments, the functionality of some modules may be broken into multiple modules or, conversely, the functionality of several modules may be combined into a single or fewer modules.

As shown, in certain embodiments, the help system matching module 200 includes one or more of a data recording module 202, an expertise determination module 204, and a help system identification module 206 to provide various features and functions. The modules are illustrated to provide a conceptual understanding of apparatus in accordance with the invention, while understanding that the manner in which the modules are actually implemented may vary considerably. For example, the help system matching module 200 could be implemented entirely on a user's computer, on one or more server computers communicating with a user's computer, or on a combination thereof.

The data recording module 202 may be configured to gather data with respect to a user's interaction with a product (e.g., a software application). Specifically, the data recording module 202 may be configured to record data relevant to a user's expertise using the product. Such data may include, for example: frequency that a user uses a product (frequent use may indicate that a user is more familiar with a product); a period of time that a user has used a product (more time with a product may indicate greater expertise using a product); time required by a user to complete tasks using a product (completing a task faster may indicate that a user is more familiar with a product); frequency that a user uses advanced features of a product (novice users may be less likely to use advanced features); and frequency of modifying advanced options of a product (novice users may be less likely to modify advanced options). Data that is relevant to a user's expertise may differ for different products (e.g., software applications). Thus, the foregoing list is provided only by way of example and not limitation.

In other embodiments, the data recording module 202 may also gather data about a user's work environment, since a user's work environment may in some cases indicate a user's general expertise. For example, if a user uses a computer workstation, as opposed to a standard desktop personal computer (PC), this may indicate that the user is a "power user" and thus more likely to have greater expertise with respect to products the user is using. Thus, in certain embodiments, hardware, operating system (i.e., Linux is not typically utilized by novice users), or applications that a user is using may be good indicators of the user's general level of expertise.

In yet other embodiments, product version may be an indicator of user expertise. For example, if a user is using an advanced or full version of a software application as opposed to a free version or a version with a reduced feature set, this may indicate that the user has additional expertise. In other cases, the data recording module 202 may record which types of information a user has accessed or technical support that a user has been provided in the past. For example, if a user frequently accesses web pages describing advanced product features, or if a user has previously received customer service for advanced product features, this may indicate that a user is a more advanced user.

Because privacy may be a concern, in certain embodiments, a user may be given the option to turn the data recording module 202 on or off as needed. For example, if a user would rather not have data collected about his or her product use, the user may opt to turn the data recording module 202 off. On the other hand, if a user desires help systems that are more tailored to the user's expertise, the user may elect to turn the data recording module 202 on. In yet other embodiments, the user may turn on or off particular data collection features. For example, the user may opt to enable data gathering with respect to use of advanced features of a product, but may opt to disable data gathering with respect to a frequency that the user uses the product.

An expertise determination module 204 may be configured to, based on data gathered by the data recording module 202, determine a level of expertise of a user with respect to a particular product. Any suitable algorithm may be used to determine such a level of expertise. For example, the expertise determination module 204 may assign a numerical value to each data category of data that is gathered, and then sum the numerical values to generate a score indicating a user's level of expertise. In certain cases, data may be weighted differently to indicate its relative importance. For example, the frequency of use of a particular product may be deemed more important than the frequency a user modifies advanced options of the product. In such a case, the numerical value associated with the frequency of use of a particular product may be multiplied by a larger weight factor than the numerical value associated with the frequency a user modifies advanced options. The results could then be summed to yield the score. Although this is a very simple algorithm, other more advanced and sophisticated algorithms are also possible and within the scope of the invention.

In certain embodiments, the expertise determination module 204 may allocate users into one or more discrete categories. For example, scores within a first range may be deemed "expert users", scores with a second range may be deemed "intermediate users", and scores within a third range may be deemed "novice users". As will be explained in more detail hereafter, these discrete categories (or ranges of expertise scores) may be used to direct users to different help systems or to tailor the help systems to the users. Although the example discussed above uses three categories, other numbers of categories are possible and within the scope of the invention.

A help system identification module 206 may be configured to, based on a level of expertise determined by the expertise determination module 204, direct a user to an appropriate help system. For example, "expert users" may be directed to a first help system geared to more advanced users, "intermediate users" may be directed to a second help system geared to users of intermediate expertise, and "novice users" may be directed to a third help system geared to novice users. Such help systems may take on many forms, including printed manuals or reference literature, phone numbers for users to call to reach support personnel, or online support materials such as web pages, community forums, lists of commonly asked questions, email support, video tutorials, chat assistants, and the like.

For example, where the help system is a phone number to call, "expert users" may be provided a first phone number, "intermediate users" may be provided a second phone number, and "novice users" may provided a third phone number, with each phone number providing a different level of support or enabling a user to speak with support personnel of differing levels of expertise. In some cases, more advanced users may be able to speak with experienced support personnel while less advanced users may only hear prerecorded messages providing answers to commonly asked questions. Similarly if the help system is a web site containing reference materials, more advanced users may be directed or linked to more advanced reference materials while less advanced users may be directed or linked to less advanced reference materials.

Figure 3:
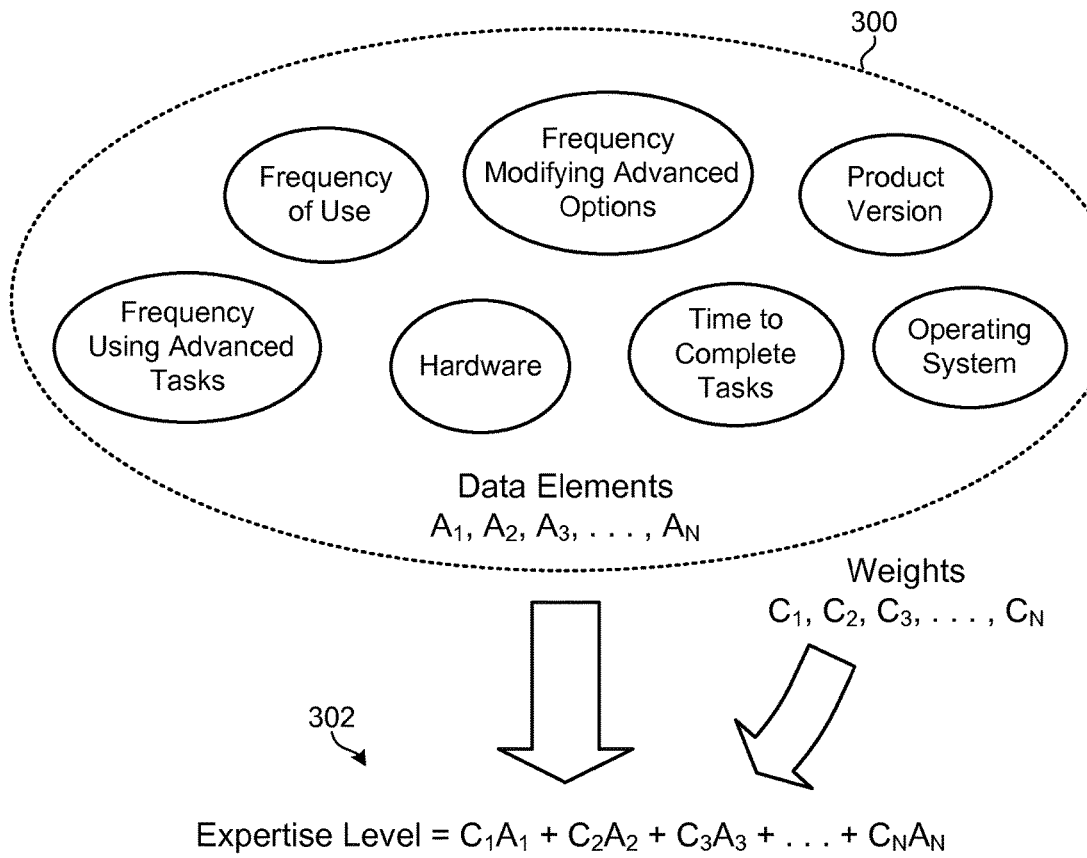
FIG. 3 is a flow diagram showing one example of operation of an expert-matched help system in accordance with the invention.
Figure 3:
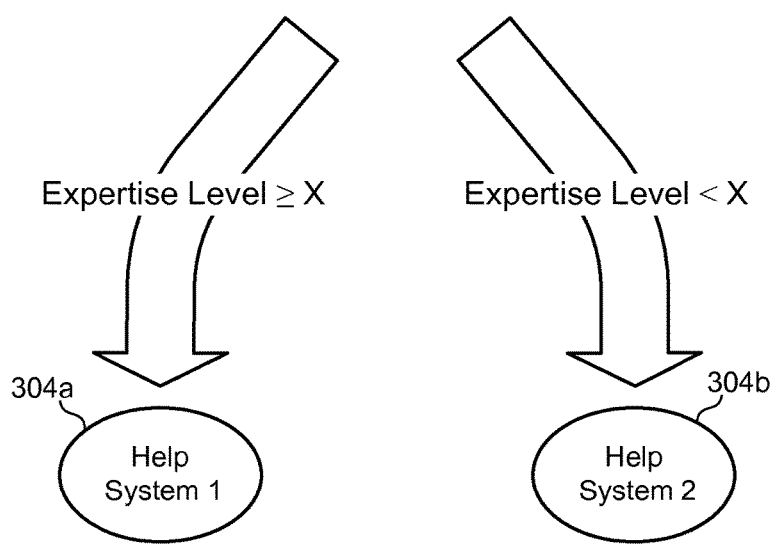

Referring to FIG. 3, one simple example of operation of an expert-matched help system is illustrated. This example is intended to be non-limiting, since an expert-matched help system in accordance with the invention may take on many different forms. For example, an expert-matched help system in accordance with the invention may use different types of data, algorithms, help systems, or the like, to achieve the objectives described herein.

In the illustrated example, the expert-matched help system is configured to gather various types of data 300 describing a user's interaction with a particular product. This data may be used to generate one or more data elements $A_1$, $A_2$, $A_3$, ..., $A_N$, such as the numerical values previously discussed. The magnitude of each data element may vary in accordance with the strength or weakness of the underlying data. As also previously mentioned, in certain embodiments, weight values $C_1$, $C_2$, $C_3$, ..., $C_N$ may optionally be assigned to each of the data elements $A_1$, $A_2$, $A_3$, ..., $A_N$ to indicate the importance of the underlying data.

In the illustrated example the data elements $A_1$, $A_2$, $A_3$, ..., $A_N$ and weight values $C_1$, $C_2$, $C_3$, ..., $C_N$ are input to an algorithm 302 to yield an expertise level. In certain embodiments, this expertise level is simply a numerical value or score that approximates a level of expertise of the user. In this example, a greater score indicates a greater level of expertise and a lesser score indicates a lesser level of expertise.

The approximated expertise level may then be mapped to one or more help systems 304. In this example, two help systems are provided. If the user's expertise level is determined to be greater than or equal to a value X, then the user is directed to a first help system 304a. Similarly, if the user's expertise level is determined to be less than the value X, the user is directed to a second help system 304b. Although users are mapped to only two help systems in this example, in other embodiments, users may be mapped to additional help systems to provide finer-grained tailoring to each user's level of expertise.

Figure 4:
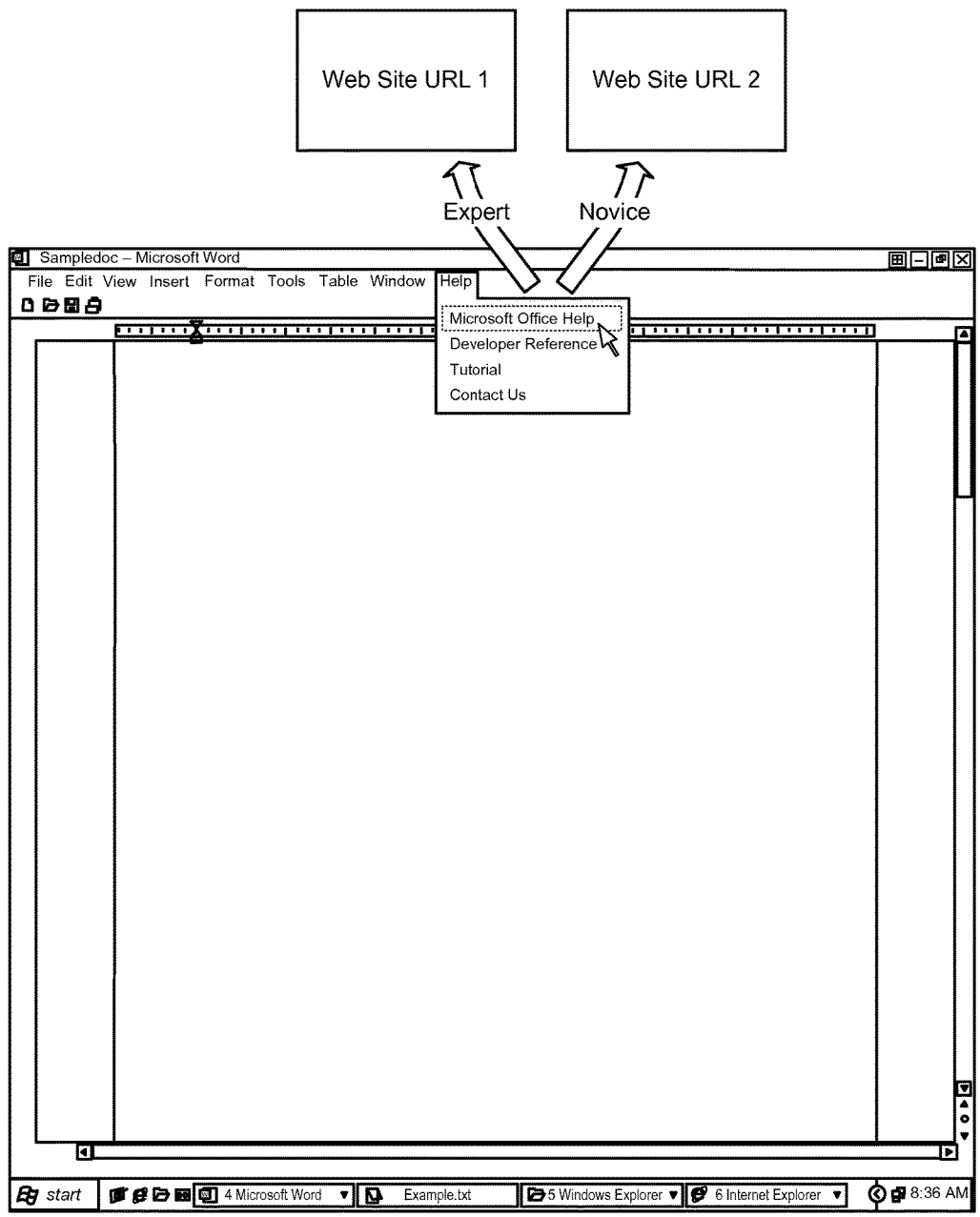
FIG. 4 is a block diagram showing one example of an expert-matched help system wherein users are directed to different website URLs based on their level of expertise.
Figure 5:
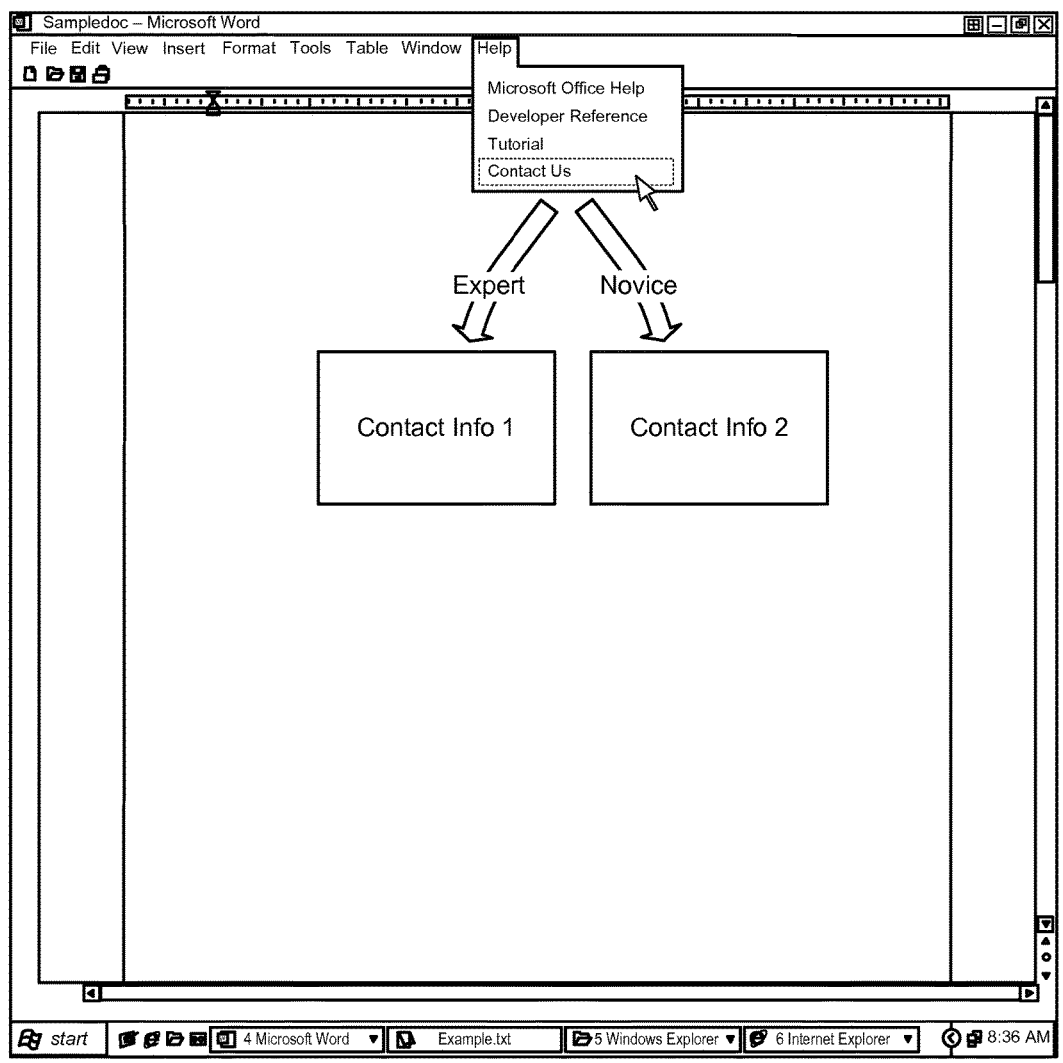
FIG. 5 is a block diagram showing one example of an expert-matched help system wherein users are provided different contact information based on their level of expertise.
Figure 6:
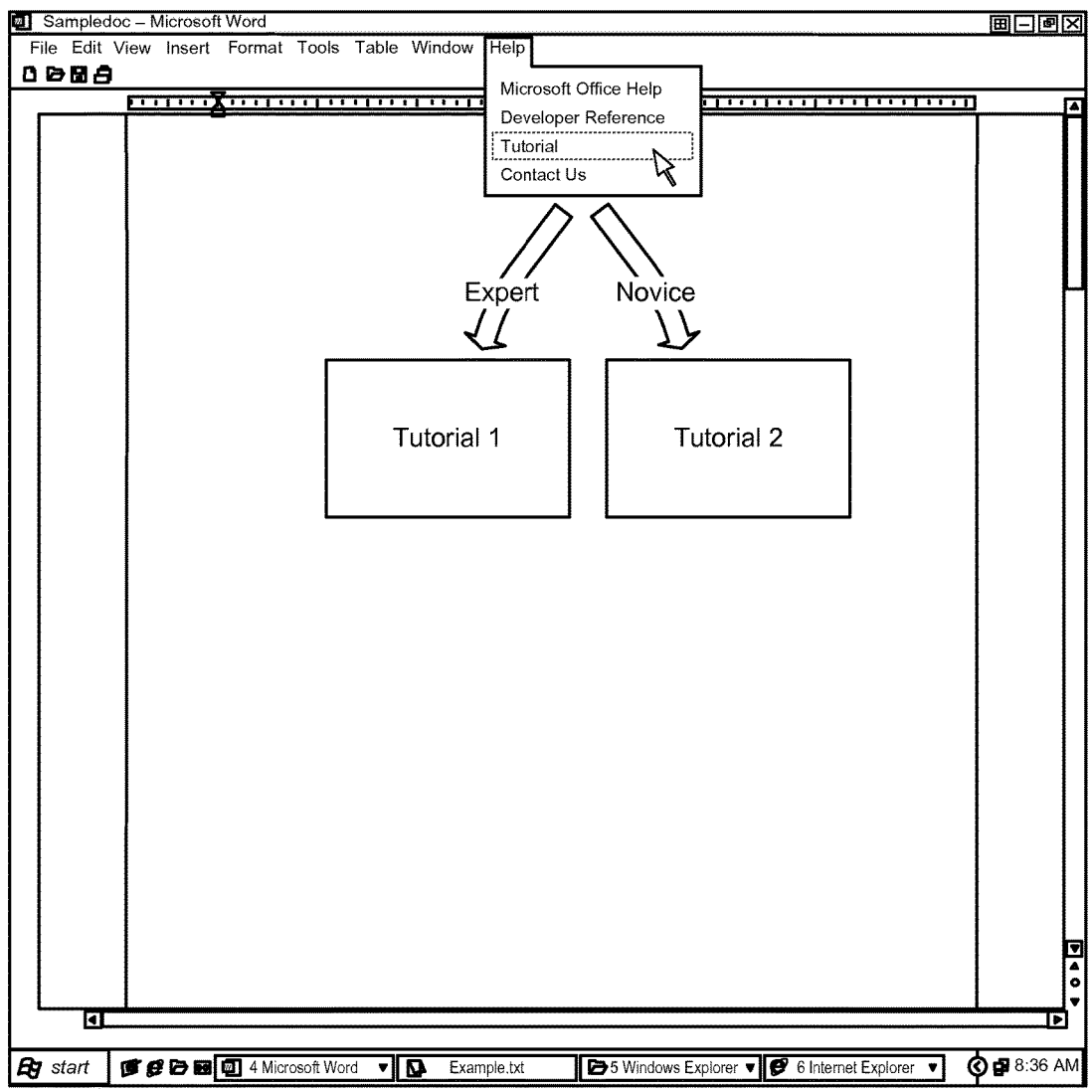
FIG. 6 is a block diagram showing one example of an expert-matched help system wherein users are provided different tutorials based on their level of expertise.

Referring to FIGS. 4, 5, and 6, various examples implementing an expert-matched help system are illustrated. In these examples, the Microsoft® Word document and word processing application is the product for which help may be sought. FIG. 4 is a diagram showing one example of an expert-matched help system wherein users are directed to two different website URLs based on their determined level of expertise. For example, when an expert user clicks on the "Microsoft® Office Help" menu item, the user may be directed to a first web site URL geared to more advanced users. Similarly, when a novice user clicks on the "Microsoft® Office Help" menu item, the user may be directed to a second web site URL geared to less advanced users.

FIG. 5 is a diagram showing an example of an expert-matched help system wherein users are provided different contact information based on their determined level of expertise. For example, when an expert user clicks on the "Contact Us" menu item, the user may be provided first contact information (e.g., phone number, email address, etc.) that may place the user in contact with support personnel able to assist more advanced users. Similarly, when a novice user clicks on the "Contact Us" menu item, the user may be provided second contact information that may place the user in contact with support personnel able to assist less advanced users.

FIG. 6 is a diagram showing an example of an expert-matched help system wherein users are provided two different tutorials based on their determined level of expertise. For example, when an expert user clicks on the "Tutorial" menu item, the user may be linked to a first tutorial (e.g., written, audio, or video tutorial) that is geared to more advanced users. Similarly, when a novice user clicks on the "Tutorial" menu item, the user may be linked to a second tutorial that is geared to less advanced users.

Apparatus and methods in accordance with the invention may be applied to a wide variety of different products. Although particular emphasis has been given to software applications, the disclosed apparatus and methods may also be applied to hardware products or products that combine both hardware and software. The disclosed apparatus and methods may also be used not only with traditional desktop-based applications, but also with applications accessed over the Internet or through a browser. Thus, the term "product" should be interpreted broadly to include a wide variety of different items, goods, applications, and services.

Different variations of the apparatus and methods disclosed herein may also fall within the scope of the invention. For example, in certain embodiments, using the disclosed expert-matched help system, expert and novice users may be directed to two entirely different types of help systems based on their level of expertise. For example, if a user is determined to be an expert user, the user may be directed to live support personnel for technical support. By contrast, if the user is determined to be a novice user, the user may be directed to written materials such as a digital manual or a web site URL. After reviewing such written materials, the user may then optionally be directed to live support personnel or other support materials if needed. Thus, in some cases, novice users may be directed to less advanced resources followed by more advanced resources (i.e., a tiered help system) whereas more advanced users may be immediately directed to more advanced resources.

The block diagrams in the Figures illustrate the architecture, functionality, and operation of possible implementations of systems, methods, and computer-usable storage media according to various embodiments of the present invention. In this regard, each block in the block diagrams may represent a module, segment, or portion of code, which comprises one or more executable instructions for implementing the specified logical function(s). It should also be noted that, in some alternative implementations, the functions discussed in association with a block may occur in a different order than discussed. For example, two functions occurring in succession may, in fact, be implemented in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The invention claimed is:

1. A method for tailoring help systems to the expertise of users, the method comprising:
    analyzing a user's computing work environment used to execute a software product, wherein analyzing the user's computing work environment comprises determining at least one of specific hardware used to execute the software product, an operating system used in association with the software product, and other software applications executed on the specific hardware;
    ascertaining, from the user's computing work environment, a level of expertise of the user in using the software product;
    receiving a request for assistance from the user with respect to the software product;
    automatically providing assistance to the user through a first help system in the event the user is ascertained to have a first level of expertise; and
    automatically providing assistance to the user through a second help system in the event the user is ascertained to have a second level of expertise different from the first level of expertise.

2. The method of claim 1, wherein ascertaining a level of expertise of the user further comprises taking into account a frequency of use of the software product.

3. The method of claim 1, wherein ascertaining a level of expertise of the user further comprises taking into account a frequency of utilizing advanced tasks of the software product.

4. The method of claim 1, wherein ascertaining a level of expertise of the user further comprises designating different types of data related to the user's interaction with the software product and designating different weights for the different types of data based on the data's importance.

5. The method of claim 1, further comprising enabling a user to turn on or off recording of different types of data related to the user's interaction with the software product.

6. The method of claim 1, wherein ascertaining a level of expertise of the user further comprises taking into account a frequency of modifying advanced options of the software product.

7. A computer program product for tailoring help systems to the expertise of users, the computer program product comprising a non-transitory computer-readable storage medium having computer-usable program code embodied therein, the computer-usable program code comprising:
 computer-usable program code to analyze a user's computing work environment used to execute software product, wherein analyzing the user's computing work environment comprises determining at least one of specific hardware used to execute the software product, an operating system used in association with the software product, and other software applications executed on the specific hardware;
 computer-usable program code to ascertain, from the user's computing work environment, a level of expertise of the user in using the software product;
 computer-usable program code to receive a request for assistance from the user with respect to the software product;
 computer-usable program code to automatically provide assistance to the user through a first help system in the event the user is ascertained to have a first level of expertise; and
 computer-usable program code to automatically provide assistance to the user through a second help system in the event the user is ascertained to have a second level of expertise different from the first level of expertise.

8. The computer program product of claim 7, wherein ascertaining a level of expertise of the user further comprises taking into account a frequency of use of the software product.

9. The computer program product of claim 7, wherein ascertaining a level of expertise of the user further comprises taking into account a frequency of utilizing advanced tasks of the software product.

10. The computer program product of claim 7, wherein ascertaining a level of expertise of the user further comprises designating different types of data related to the user's interaction with the software product and designating different weights for the different types of data based on the data's importance.

11. The computer program product of claim 7, further comprising computer-usable program code to enable a user to turn on or off recording of different types of data related to the user's interaction with the software product.

12. The computer program product of claim 7, wherein ascertaining a level of expertise of the user further comprises taking into account a frequency of modifying advanced options of the software product.

13. An apparatus for tailoring help systems to the expertise of users, the apparatus comprising:
 at least one processor;
 at least one memory device coupled to the at least one processor and storing computer instructions to cause the at least one processor to:
  analyze a user's computing work environment used to execute a software product, wherein analyzing the user's computing work environment comprises determining at least one of specific hardware used to execute the software product, an operating system used in association with the software product, and other software applications executed on the specific hardware;
  ascertain, from the user's computing work environment, a level of expertise of the user in using the software product;
  receive a request for assistance from the user with respect to the software product;
  automatically provide assistance to the user through a first help system in the event the user is ascertained to have a first level of expertise; and
  automatically provide assistance to the user through a second help system in the event the user is ascertained to have a second level of expertise different from the first level of expertise.

14. The apparatus of claim 13, wherein ascertaining a level of expertise of the user further comprises taking into account a frequency of use of the software product.

15. The apparatus of claim 13, wherein ascertaining a level of expertise of the user further comprises taking into account a frequency of utilizing advanced tasks of the software product.

16. The apparatus of claim 13, wherein ascertaining a level of expertise of the user further comprises designating different types of data related to the user's interaction with the software product and designating different weights for the different types of data based on the data's importance.

17. The apparatus of claim 13, wherein ascertaining a level of expertise of the user further comprises taking into account a frequency of modifying advanced options of the software product.

* * * * *